(12) United States Patent
Johnson et al.

(10) Patent No.: US 8,230,134 B2
(45) Date of Patent: Jul. 24, 2012

(54) FAST PATH SCSI IO

(75) Inventors: Stephen B. Johnson, Colorado Springs, CO (US); Timothy E. Hoglund, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 181 days.

(21) Appl. No.: 12/765,027

(22) Filed: Apr. 22, 2010

(65) Prior Publication Data

US 2010/0306420 A1 Dec. 2, 2010

Related U.S. Application Data

(60) Provisional application No. 61/217,561, filed on Jun. 1, 2009.

(51) Int. Cl.
*G06F 13/28* (2006.01)
(52) U.S. Cl. ........................................................ 710/22
(58) Field of Classification Search ..................... 710/22
See application file for complete search history.

(56) References Cited

U.S. PATENT DOCUMENTS

| | | | |
|---|---|---|---|
| 6,427,173 B1 * | 7/2002 | Boucher et al. | 709/238 |
| 7,133,940 B2 * | 11/2006 | Blightman et al. | 710/22 |
| 7,925,796 B1 * | 4/2011 | Bailey et al. | 710/5 |
| 2003/0167346 A1 * | 9/2003 | Craft et al. | 709/238 |

OTHER PUBLICATIONS

Force10 Networks, Inc., "White Paper—Ethernet: THe High Bandwidth Low-Latency Data Center Switching Fabric", Copyright 2008, pp. 1-7.*
Shankland, Stephen, "IBM plots new Unix server chips", Apr. 25, 2002, CNET.com, pp. 1-5 http://news.cnet.com/IBM-plots-new-Unix-server-chips/2100-1010_3-892774.html.*
Dongkook Park; Das, R.; Nicopoulos, C.; Jongman Kim; Vijaykrishnan, N.; Iyer, R.; Das, C.R.; , "Design of a Dynamic Priority-Based Fast Path Architecture for On-Chip Interconnects," High-Performance Interconnects, 2007. HOTI 2007. 15th Annual IEEE Symposium on , vol., No., pp. 15-20, Aug. 22-24, 2007.*
Hu, E. C.; Joubert, P. A.; King, R. B.; LaVoie, J. D.; Tracey, J. M.; , "Adaptive Fast Path Architecture," IBM Journal of Research and Development , vol. 45, No. 2, pp. 191-206, Mar. 2001.*

* cited by examiner

*Primary Examiner* — Eron J Sorrell
*Assistant Examiner* — Dayton Lewis-Taylor
(74) *Attorney, Agent, or Firm* — Suiter Swantz pc llo

(57) ABSTRACT

A hardware automated IO path, comprising a message transport unit for transporting an IO request to a local memory via a DMA operation and determining a LMID for associating with a request descriptor of the IO request; a fastpath engine for validating the request descriptor and creating a fastpath descriptor based on the request descriptor; a data access module for performing an IO operation based on the fastpath descriptor and posting a completion message into the fastpath completion queue upon a successful completion of the IO operation. The fastpath engine is further configured for: receiving the completion message, releasing the IO request stored in the local memory, and providing a reply message based on the completion message. The message transport unit is further configured for providing the reply message in response to the IO request.

16 Claims, 3 Drawing Sheets

FAST PATH SCSI IO

CROSS-REFERENCE TO RELATED APPLICATIONS

The present application claims the benefit under 35 U.S.C. §119(e) of U.S. Provisional Application Ser. No. 61/217,561, filed Jun. 1, 2009. Said U.S. Provisional Application Ser. No. 61/217,561 is hereby incorporated by reference in its entirety.

TECHNICAL FIELD

The present invention relates to the field of Input/Output (IO) processing and particularly to a system and method for providing a hardware automated IO path.

BACKGROUND

Small Computer System Interface (SCSI) provides a set of standards for connecting and transferring data between computers and peripheral devices. For instance, an initiator (e.g., a computer) may initiate an IO request, which may start data transfers between the initiator and a target device (e.g., a storage device). Input/output (IO) controllers may be utilized to provide IO paths between computers and storage devices to facilitate such data transfers.

SUMMARY

Accordingly, an embodiment of the present disclosure is directed to a hardware automated input/output (IO) path. The IO path may comprise a message transport unit configured for transporting an IO request to a local memory via a direct memory access (DMA) operation, the message transport unit further configured for determining a local message index descriptor (LMID) for associating with a request descriptor of the IO request. The IO path may also comprise a fastpath engine communicatively coupled with the message transport unit, the fastpath engine configured for validating the request descriptor and creating a fastpath descriptor based on the request descriptor, the fastpath engine further configured for posting the fastpath descriptor into a fastpath descriptor control queue. The IO path may further comprise a data access module communicatively coupled with the fastpath descriptor control queue and a fastpath completion queue, the data access module configured for performing an IO operation based on the fastpath descriptor, the data access module further configured for posting a completion message into the fastpath completion queue upon a successful completion of the IO operation. Furthermore, the fastpath engine is configured for: receiving the completion message from the fastpath completion queue, releasing the IO request stored in the local memory, and providing a reply message based on the completion message; and the message transport unit is configured for providing the reply message in response to the IO request.

A further embodiment of the present disclosure is directed to a system for handling an input/output (IO) request. The system may comprise a message transport unit configured for transporting the IO request to a local memory via a direct memory access (DMA) operation, the message transport unit further configured for determining a local message index descriptor (LMID) for associating with a request descriptor of the IO request. The system may also comprise a fastpath engine communicatively coupled with the message transport unit, the fastpath engine configured for validating the request descriptor and creating a fastpath descriptor based on the request descriptor, the fastpath engine further configured for posting the fastpath descriptor into a fastpath descriptor control queue. The system may further comprise a data access module communicatively coupled with the fastpath descriptor control queue and a fastpath completion queue, the data access module configured for performing an IO operation based on the fastpath descriptor, the data access module further configured for posting a completion message into the fastpath completion queue upon a successful completion of the IO operation. Furthermore, the fastpath engine is configured for: receiving the completion message from the fastpath completion queue, releasing the IO request stored in the local memory, and providing a reply message based on the completion message; and the message transport unit is configured for providing the reply message in response to the IO request.

An additional embodiment of the present disclosure is directed to a method for handling an IO request. The method may comprise transporting the IO request to a local memory via a direct memory access (DMA) operation; determining a local message index descriptor (LMID) for associating with a request descriptor of the IO request; creating a fastpath descriptor based on the request descriptor; performing an IO operation according to the fastpath descriptor; providing a completion message upon a successful completion of the IO operation; releasing the IO request stored in the local memory; and providing a reply message in response to the IO request, the reply message being provided based on the completion message.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

A hardware automated IO path is disclosed. The hardware automated IO path does not require any firmware/software assistance to handle an IO request. Utilizing the hardware automated IO path of the present disclosure, small block (block size less than or equal to 4K bytes) IO performances may be increased to over one million per second. Furthermore, eliminating CPU assistance from the IO path may reduce/relax CPU performance requirements, allowing smaller, more energy efficient and more cost effective designs to be implemented.

Figure 1:
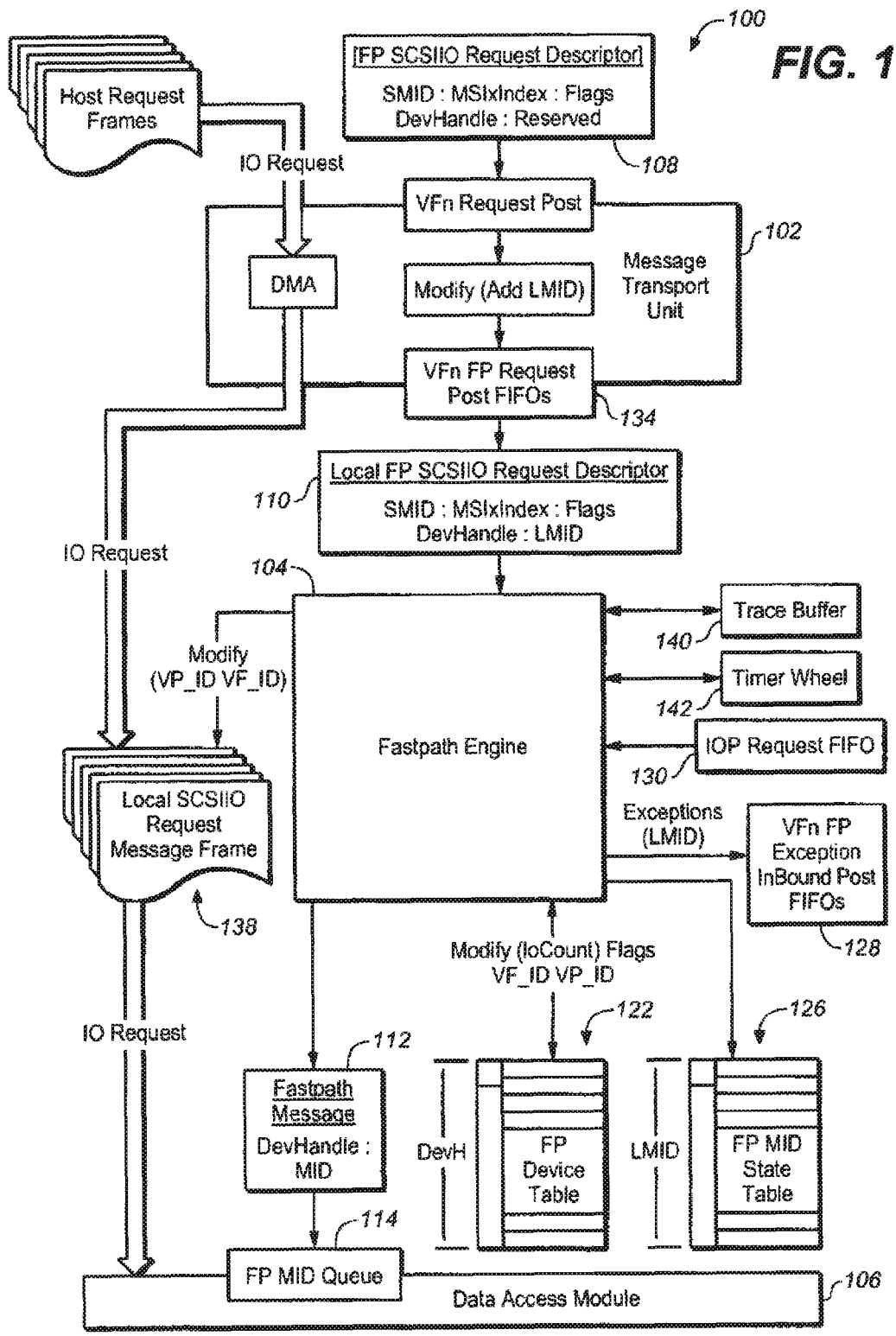
FIG. 1 is a block diagram illustrating the process flow of a start path of a hardware automated IO path of the present disclosure.
Figure 2:
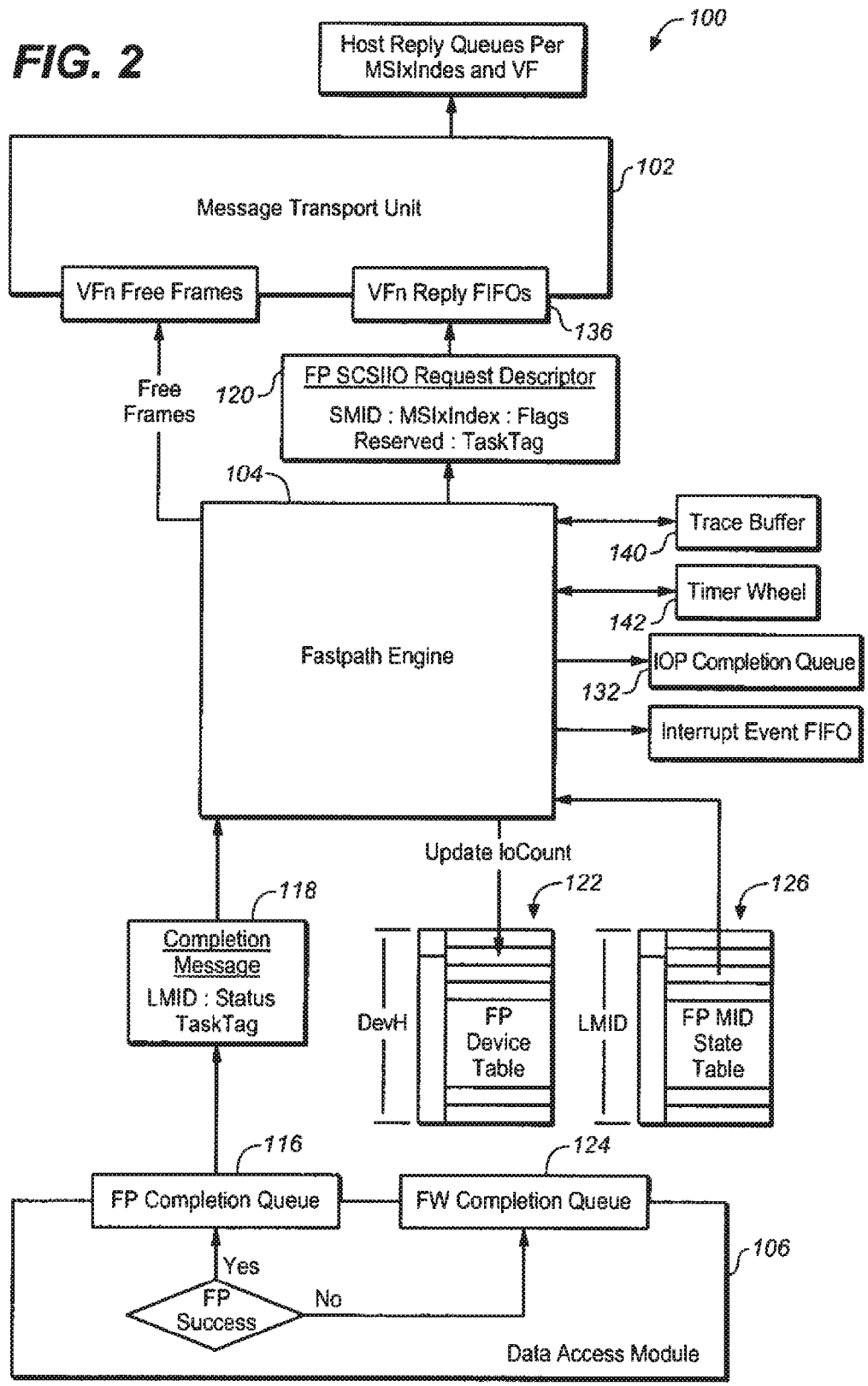
FIG. 2 is a block diagram illustrating the process flow of a completion path of the hardware automated IO path of the present disclosure.

Referring to FIGS. 1 and 2, block diagrams depicting the process flow of the hardware automated IO path 100 of the present disclosure is shown. The hardware automated IO path 100 may be configured for handling commands such as Small Computer System Interface (SCSI) Input/Output (IO) requests, SATA/ATA commands and the like. The IO path 100 may comprise a message transport unit 102, a fastpath engine 104 and a data access module 106. In one embodiment, the message transport unit 102, the fastpath engine 104 and the data access module 106 are implemented as state machines realized utilizing electronic circuits. In this manner, the message transport unit 102, the fastpath engine 104 and the data access module 106 are capable of executing stage logics for handling IO requests without firmware/software control.

The handling of an IO request may be illustrated as two functional paths performed by the IO path 100. The start path of the IO request is illustrated in FIG. 1 and the completion path of the IO request is illustrated in FIG. 2. In the start path of the IO request, the message transport unit 102 is configured for transporting an IO request to a local memory 138 via a direct memory access (DMA) operation. The IO request may be generated by a data requester/initiator (e.g., from the host operating system). The data initiator may utilize a flag in the request descriptor 108 of the IO request to indicate whether a particular IO request is to be handled by the hardware automated IO path 100 or by a traditional/regular IO path.

The request descriptor 108 may also specify fields including a system message index descriptor (SMID), a device handle and one or more flags. The message transport unit 102 receives the request descriptor 108 for each IO request to be handled by the hardware automated IO path 100. The message transport unit 102 also determines a local message index descriptor (LMID) for each of these IO requests (the LMID provides local address information of the corresponding IO request stored in the local memory 138). The message transport unit 102 may then associate the LMID with its corresponding request descriptor 108 to form a local IO request descriptor 110.

The fastpath engine 104 is communicatively coupled with the message transport unit 102. The fastpath engine 104 may receive local IO request descriptors 110 from the message transport unit 102 via one or more request descriptor post queues 134. In a particular embodiment configured for supporting PCIe single root IO virtualization (SR-IOV) specification, one request descriptor post queue 134 may be established for each virtual function (VF). In such cases, a prioritization scheme may be established if more than one local IO request descriptor queues are utilized. For example, a round robin approach may be utilized by the fastpath engine 104 to process the plurality of queues. In addition, the data initiator (e.g., the host operating system) may also assign priorities to the queues based on its processing needs.

The fastpath engine 104 is configured for validating each local IO request descriptor 110 received from one of the request descriptor post queues 134. For instance, the fastpath engine 104 may validate a given request descriptor to determine whether the descriptor was built correctly and/or whether the data initiator has the necessary permissions to make such a request. If the validation is unsuccessful, one or more exception queues 128 may be utilized for storing the exceptions. In one embodiment, one exception queue 128 may be established for each virtual function (VF).

If the validation is successful, the fastpath engine 104 may create a fastpath descriptor 112 based on the local IO request descriptor 110. In one embodiment, the fastpath descriptor 112 may specify at least a device handle (DevHandle) and the LMID (both may be obtained from the local IO request descriptor 110). The device handle provides a reference to a target end device (e.g., a storage drive), and the LMID provides the local address information indicating where the IO request is stored in the local memory 138. The fastpath descriptor 112 is then posted into a fastpath descriptor control queue 114 and waits to be processed by the data access module 106.

The data access module 106 is communicatively coupled with the fastpath descriptor control queue 114 and a fastpath completion queue 116. The data access module 106 is configured for providing data access to one or more physical/virtual target end devices. The data access module 106 may support specifications including, but are not limited to, SAS, Fibre Channel, iSCSI, SATA, InfiniBand, FCoE, Flash memory protocol engines and the like. In one embodiment, the data access module 106 retrieves the IO request stored in the local memory 138 based on the fastpath descriptor 112 received (e.g., the LMID may be utilized to locate the IO request in the local memory). The data access module 106 may then utilize conventional hardware based data retrieving implementations to perform IO operations requested in the IO request. Upon a successful completion of the IO operations, the data access module 106 may post a completion message into the fastpath completion queue 116. The data access module 106 may also send a completion interrupt to the fastpath engine 104.

The fastpath engine 104 may retrieve the completion message 118 from the fastpath completion queue 116 in the completion path of the IO request, as illustrated in FIG. 2. The fastpath engine 104 may then inform the message transport unit 102 to release the local IO request stored in the local memory 138 so that the released memory space may be reused for other requests. The fastpath engine 104 also constructs a reply descriptor 120 based on the completion message 118. The message transport unit 102 receives the reply descriptor 120 in the reply queue 136 and provides the reply message to the data initiator to complete the IO request. In one embodiment, more than one reply queue 136 may be established for receiving the reply descriptors 120. For example, one reply queue may be established for each virtual function (VF). In another example, multiple reply queues may be established for a single function.

It is contemplated that the fastpath engine 104 be configured to have a hardware component for handling the start path (requestor) and another hardware component for handling the completion path (completer). The requestor and the completer components may be configured to execute concurrently. In one embodiment, the requestor and the completer components may be realized in a unified electronic circuit. Alternatively, separate electronic circuits may be utilized to realize the requestor and the completer. It is understood that other circuitry arrangements may be utilized to realize the requestor and the completer components of the fastpath engine 104 without departing from the spirit and scope of the present disclosure.

It is contemplated that the fastpath engine 104 may also be configured for processing IO requests received at an IO processor queue 130 in addition to the requests received from the message transport unit 102. The IO processor queue 130 may be accessible to data initiators such as an embedded CPU, a controller firmware and the like. The fastpath engine 104 may handle an IO request from the IO processor queue 130 similar to those received from the message transport unit 102. However, upon a successful completion of the IO request from the IO processor queue 130, the fastpath engine 104 may post the reply message to the IO processor completion queue 132 instead of the message transport unit 102. Furthermore, the fastpath engine 104 may give the IO processor queue 130 priority over the one or more request descriptor post queues 134.

In one embodiment, the hardware automated IO path 100 of the present disclosure may be configured for handling only successful IO operations. If an exception and/or error occurred while processing a particular IO operation, this IO operation may be redirected to another IO path for processing (e.g., redirect to a regular IO path 124 with firmware controls, as illustrated in FIG. 2).

In one embodiment, the hardware automated IO path 100 may not maintain per device order of the IO requests as received from the data initiator. Devices utilizing the hardware automated IO path 100 may be designed for out of order command processing. However, if ordered processing is required, then the devices may be designed to ensure that order dependent commands have completed before sending the next ordered dependent command to the IO controller.

The hardware automated IO path 100 may further comprise an IO context table 126 for storing context information regarding the IO requests currently being processed. For instance, the fastpath engine 104 may create an IO context record corresponding to each IO request (e.g., based on the request descriptor 110 received). Such IO context records may be stored in the IO context table 126 and indexed by the LMID of each request. Each IO context record may be updated based on the current state of the IO request. In this manner, upon a successful completion of the IO request, the fastpath engine 104 may be able to build the reply descriptor based on the information stored in the IO context record, without having to read the original IO request. The IO context record for a particular IO request may be cleared once the reply descriptor for this IO request is built.

The hardware automated IO path 100 may further comprise a fastpath device table 122 for storing a list of fastpath enabled target end devices accessible through the data access module 106. It is understood that not all device types support the hardware automated IO path 100. For instance, the data access module 106 may not provide fastpath data access to devices such as IR volumes, RAID volumes, and certain SATA, SES, and ATAPI devices. In one embodiment, a list of fastpath enabled target end devices may be determined at device discovery time, and the list may be stored in the fastpath device table 122. The fast path device table 122 may be index by the device handle (i.e., a reference to the target end device). The fastpath engine 104 may maintain the current state information (e.g., IO count information and the like) associated with each fastpath enabled device.

In a specific embodiment, the hardware automated IO path 100 of the present disclosure is utilized for supporting the Message Passing Interface (MPI) specification. A new fastpath capable bit (e.g., Bit 13 of the Flags field in Page 0 of each target device) may be utilized to indicate whether the target device is fastpath capable.

MPI request descriptors may also be modified accordingly. For example, the modified request descriptor may be illustrated as follows:

| 31 | 24 23 | 16 15 | 8 7 | 0 | Byte |
|---|---|---|---|---|---|
| | SMID | MSIxIndex | | RequestFlags | 0x00 |
| | DevHandle | | LMID (for IOC use only) | | 0x04 |

Where the RequestFlags may include the addition of descriptor type 6 indicating that the IO request is to be processed as a fastpath IO request:

| Bits | Definition |
|---|---|
| Bits[7:4] | Reserved |
| Bits[3:1] | Request Descriptor Type |
| | 0 = SCSI IO Request |
| | 1 = SCSI Target Request (TargetAssist and TargetStatusSend) |
| | 3 = High Priority |
| | 4 = Default |
| | 6 = FP SCSI IO Request |
| | All other values reserved. |
| Bit 0 | IOC FIFO Marker (for IOC use only, host must treat as reserved) |

The MSIxIndex field is also specified in the above request descriptor in order to support multiple reply queues. The MSIxIndex value in the reply descriptor specifies which host reply queue to post the reply descriptor to. There is a one to one mapping between MSIxIndex and reply FIFO (0:0, 1:1, 2:2 . . . ) in the specific embodiment, and eight reply queues may be utilized for each virtual function.

MPI reply descriptors may also be modified accordingly. For example, the modified reply descriptor may be illustrated as follows:

| 31 | 24 23 | 16 15 | 8 7 | 0 | Byte |
|---|---|---|---|---|---|
| | SMID | MSIxIndex | | ReplyFlags | 0x00 |
| | Reserved | | TaskTag | | 0x04 |

Where the ReplyFlags may also include the addition of descriptor type 6 indicating that the reply is in response to a fastpath IO request:

| Bits | Definition |
|---|---|
| Bits[7:4] | Reserved |
| Bits[3:1] | Reply Descriptor Type |
| | 6 = FP SCSI IO Reply |
| Bit 0 | IOC FIFO Marker (for IOC use only, host must treat as reserved) |

It is understood that additional bits/flags may be introduced to facilitate communication with other components in storage system. For example, an IO path bit may be introduced so that when the IO path bit is set to 0, the data request may be processed as normal, and when the IO path bit is set to 1, the data request may be processed as a fastpath request.

Furthermore, the following table depicts an exemplary IO context record in the specific embodiment configured for supporting the MPI specification:

| Name | Bytes | Description |
|---|---|---|
| TimerBucket | 0x00 | Timer wheel Bucket, managed by fastpath engine |
| MSIxIndex | 0x01 | Required by message transport unit in reply descriptor |
| VF_ID | 0x02 | Virtual Function number |
| FPEStatus | 0x03 | fastpath engine exception Status |

-continued

| Name | Bytes | Description |
| --- | --- | --- |
| FPEFlags | 0x05-0x04 | fastpath engine current state of MID |
| DevHandle | 0x07-0x06 | DevHandle |
| FWFlags | 0x09-0x08 | Firmware control flags (Written by firmware and read by fastpath engine) |
| PendNextMID | 0x0B-0x0A | fastpath engine Pending IO Queue Next MID value |
| SMID[1] | 0x0D-0x0C | System request message index number |
| Reserved | 0x0F0x0E | |

In this exemplary IO context record, the FPEStatus field may be utilized to specify the reason that the fastpath engine (FPE) 104 placed the IO request into the exception queue 128. Possible FPEStatus values may include, but are not limited to, "DEVICE_FP_DISABLED", "INVALID_DESCRIPTOR_TYPE", or "DEVICE_HANDLE_OUT_OF_RANGE". The FPEFlags field may be utilized to keep track of the current state of the IO when being processed by the FPE. The available state of the IO may vary based on specific implementation of the IO path. The FWFlags field may be utilized to configure certain behaviors of the FPE 104. For example, a reply destination bit may be specified in the FWFlags field, wherein when the reply destination bit is set to 0, the FPE 104 is to post the reply response of the corresponding IO request to the message transport unit 102; otherwise, the FPE 104 is to post the reply response of the corresponding IO request to the IO processor completion queue 132 instead of the message transport unit 102.

In addition, the following table depicts an exemplary record of the fastpath device table 122:

| Name | Bytes | Description |
| --- | --- | --- |
| IoCount | 0x01-0x00 | FPE increments and decrements this field when FPE is enable for the device |
| FPEPendHead | 0x03-0x02 | FPE pending queue head MID |
| FPEPendTail | 0x05-0x04 | FPE pending queue tail MID |
| FPEFlags | 0x06 | FPE reads and writes flags in this field |
| VP_ID | 0x07 | FPE writes to SCSIIO Request Message |
| VF_ID | 0x08 | FPE compares this value with the Virtual Function Request Post FIFO number and writes to SCSIIO Request Message |
| FPEFWFlags | 0x09 | FPE only reads flags in this field during the start and completion paths |
| Qdepth | 0x0B-0x0A | Current active Qdepth, FPE compares with IoCount |
| FWFlags | 0x0F-0x0C | Firmware defined device flags; may be used by FPE for tracing (when enabled) |

Utilizing this exemplary device table data, the FPE 104 may provide a mechanism to accommodate atomic write operations to increment and decrement the IoCount for the device that is currently being accessed. For example, on the start path (as illustrated in FIG. 1), the FPE 104 may increment IoCount (read/modify/write) for a particular target device and compare the incremented value to the Qdepth field. If the IoCount value is greater than Qdepth then the FPE 104 may redirect the IO to the firmware via the exception queue with a FPSTATUS_QDEPTH_LIMIT exception. In another example, on the completion path (as illustrated in FIG. 2), the FPE 104 may decrement the IoCount (read/modify/write) for a particular target device and check the decremented value. If the decremented IoCount value is less than zero, an error may have occurred and the FPE 104 may HALT and interrupt firmware with an error status.

It is understood that the IO context record and the fastpath device table structure illustrated above are merely exemplary.

Alternative and/or additional fields may be included in the IO context record and the fastpath device table structure without departing from the spirit and scope of the present disclosure. It is also contemplated that the hardware automated IO path 100 of the present disclosure may be utilized for supporting other communication specifications such as the Intelligent Input/Output (I2O) specification. It is understood that the IO context table and/or the fastpath device table (as described above) may be configured to be compatible with the communication specification that is being used.

It is contemplated that the hardware automated IO path 100 may further comprise a hardware automated trace buffer 140. Providing tracing/logging capabilities may be appreciated for debugging purposes. For instance, when enabled, the fastpath engine 104 may write log information per IO to the trace buffer 140. In one embodiment, the trace buffer 140 may be a circular queue configured for logging normal start IO information and exception information. In this manner, the log may cycle through (overwriting the previous logs). Alternatively, the logged information may be transported to other locations instead of being overwritten.

The trace buffer 140 may utilize a dedicated 32 KB memory that may be configured as either a single 32 K circular buffer or may be divided in to two 16 KB buffers where one fills while the other is drained via a DMA operation. The trace buffer 140 may also include a buffer manager configured for managing the DMA operations to an extended buffer. The extended buffer may be located in the IO controller or system memory. The trace buffer 140 may automatically DMA from its dedicated trace buffers to the extended buffer.

It is also contemplated that the hardware automated IO path 100 may also comprise a hardware automated timer wheel 142. A timer may be configured for timing each IO operation so that IO timeouts may be handled. For example, a timeout value may be provided by the data request initiator and may specify the value in units of seconds. In one embodiment, the timer wheel 142 may include a circular buffer of 256 entries of 16 bits each and a pointer that always points to one of the circular buffer entries. The pointer may advance once a second. In this manner, if there are no outstanding IOs being timed, all the counters are zero. If the pointer ever advances to a counter entry that is non-zero, the count may then indicate the number of IOs that have timed out. The FPE may HALT and interrupt firmware when timeouts are detected.

It is further contemplated that access to the hardware automated trace buffer 140 and timer wheel 142 may be shared with other components (hardware or firmware components) of the storage system. For example, a different IO path may also need to log information and/or use the timer wheel to control IO operation time out. In addition, atomic write operations may be utilized to facilitate data access to the hardware automated trace buffer 140 and timer wheel 142.

Figure 3:
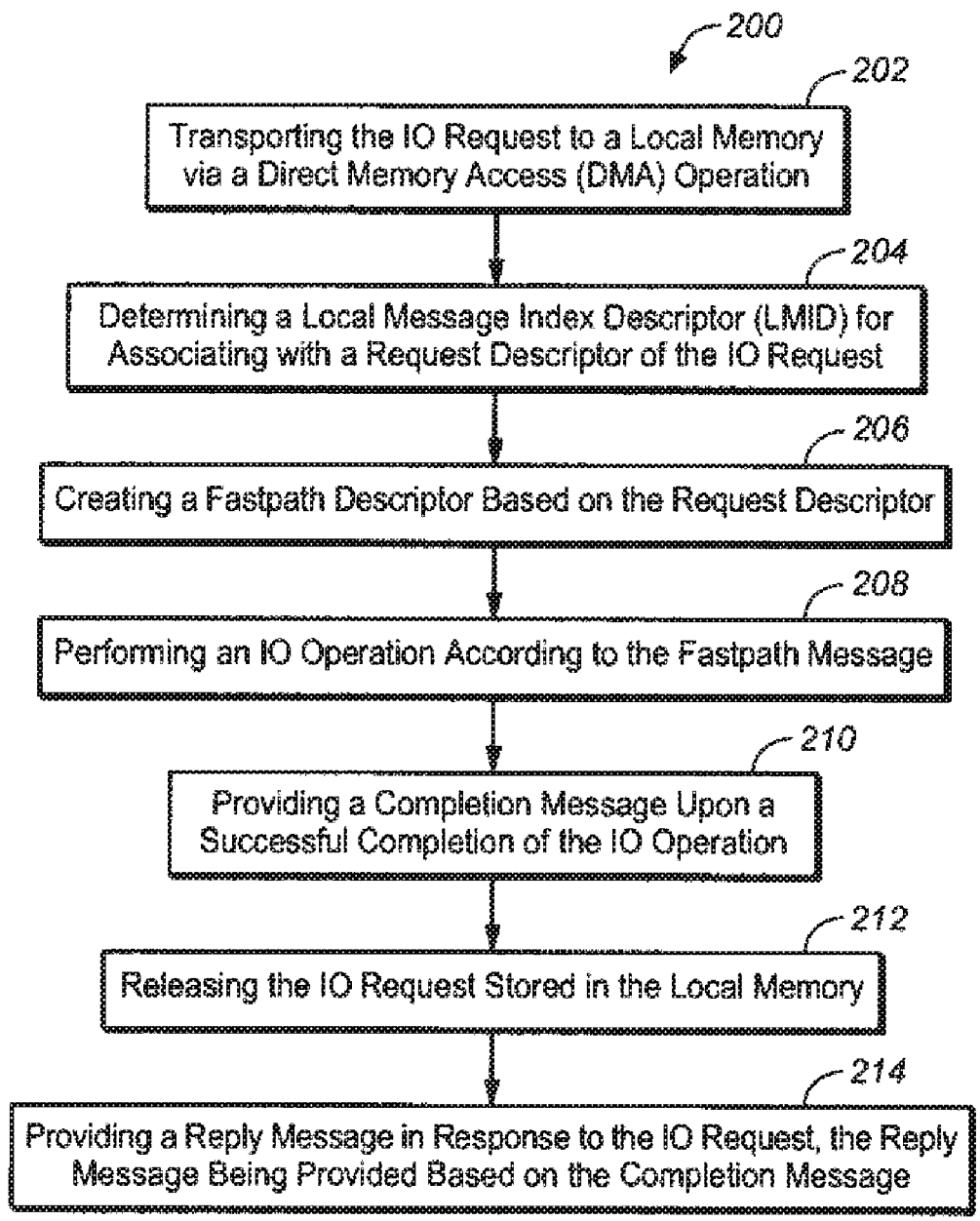
FIG. 3 is a flow chart illustrating a method for handling an IO request in accordance with the present disclosure.

FIG. 3 shows a flow diagram illustrating steps performed by a method 200 for handling an IO request received from a data initiator. In one embodiment, the IO request is transported to a local memory via a direct memory access (DMA) operation in step 202. The address information (LMID) of the IO request stored in the local memory is determined and associated with a request descriptor of the IO request in step 204. In Step 206, the request descriptor is processed and a fastpath descriptor is created based on the information specified in the request descriptor. The fastpath descriptor may be communicated to a data access module, which is configured for providing data access to one or more physical/virtual target end devices (as previously described).

The data access module may retrieve the IO request stored in the local memory based on the information provided in the fastpath descriptor (e.g., based on the LMID). The data access module may then perform the IO operation requested by the IO request in step 208. If the IO operation is performed successfully, step 210 may provide a completion message in response. Once the completion message is received, step 212 may release the IO request stored in the local memory, and step 214 may construct a reply message based on the completion message. The reply message is then communicated to the data initiator as the response to the IO request. However, If the IO operation is performed unsuccessfully (e.g., an exception has occurred), this IO operation may be redirected to another IO path for processing.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A hardware automated input/output (IO) path, comprising:
   a message transport unit configured for transporting an IO request to a local memory via a direct memory access (DMA) operation, the message transport unit further configured for determining a local message index descriptor (LMID) for associating with a request descriptor of the IO request;
   a fastpath engine communicatively coupled with the message transport unit, the fastpath engine configured for validating the request descriptor and creating a fastpath descriptor based on the request descriptor, the fastpath engine further configured for posting the fastpath descriptor into a fastpath descriptor control queue;
   a data access module communicatively coupled with the fastpath descriptor control queue and a fastpath completion queue, the data access module configured for performing an IO operation based on the fastpath descriptor, the data access module further configured for posting a completion message into the fastpath completion queue upon a successful completion of the IO operation;
   a fastpath device table communicatively coupled with said fastpath engine, the fastpath device table configured for storing a list of fastpath enabled devices, and said fastpath engine further configured for maintaining current state information associated with each of the list of fastpath enabled devices;
   said fastpath engine further configured for: receiving the completion message from the fastpath completion queue, releasing the IO request stored in the local memory, and providing a reply message based on the completion message; and
   said message transport unit further configured for providing the reply message in response to the IO request;
   wherein each of said message transport unit, said fastpath engine and said data access module are implemented as a state machine realized utilizing an electronic circuit.

2. The hardware automated IO path of claim 1, wherein the data access module further configured for redirecting the IO operation to another IO path in an occurrence of exception, the other IO path being different from the hardware automated IO path.

3. The hardware automated IO path of claim 1, wherein said fastpath descriptor comprises:
   a device handle for providing a reference to a physical target end device; and the LMID associated with the request descriptor.

4. The hardware automated IO path of claim 1, further comprising an IO context table communicatively coupled with said fastpath engine, wherein said fastpath engine further configured for:
   upon validation of the request descriptor, creating an IO context record corresponding to the request descriptor and storing the IO context record in the IO context table; and
   upon completion of the IO request, deleting the IO context record from the IO context table.

5. The hardware automated IO path of claim 1, further comprising a hardware automated trace buffer configured for logging context information associated with the IO request.

6. The hardware automated IO path of claim 1, further comprising an exception queue configured for storing a validation exception from the fastpath engine.

7. The hardware automated IO path of claim 1, further comprising a hardware automated timer wheel configured for detecting an occurrence of a time out when handling the IO request.

8. The hardware automated IO path of claim 1, wherein said message transport unit, said fastpath engine and said data access module are configured for supporting at least one of a Message Passing Interface (MPI) specification and an Intelligent Input/Output (I2O) specification.

9. The hardware automated IO path of claim 1, wherein said data access module is configured for supporting at least one of: SAS, Fibre Channel, iSCSI, SATA, InfiniBand, FCoE and Flash memory protocol engines.

10. A system for handling an input/output (IO) request, comprising:
    a message transport unit configured for transporting the IO request to a local memory via a direct memory access (DMA) operation, the message transport unit further configured for determining a local message index descriptor (LMID) for associating with a request descriptor of the IO request;
    a fastpath engine communicatively coupled with the message transport unit, the fastpath engine configured for validating the request descriptor and creating a fastpath descriptor based on the request descriptor, the fastpath engine further configured for posting the fastpath descriptor into a fastpath descriptor control queue;
    a data access module communicatively coupled with the fastpath descriptor control queue and a fastpath completion queue, the data access module configured for performing an IO operation based on the fastpath descriptor, the data access module further configured for posting a completion message into the fastpath completion queue upon a successful completion of the IO operation;
    a fastpath device table communicatively coupled with said fastpath engine, the fastpath device table configured for storing a list of fastpath enabled devices, and said fastpath engine further configured for maintaining current state information associated with each of the list of fastpath enabled devices;
said fastpath engine further configured for: receiving the completion message from the fastpath completion queue, releasing the IO request stored in the local memory, and providing a reply message based on the completion message; and
said message transport unit further configured for providing the reply message in response to the IO request.

11. The system of claim 10, wherein the data access module further configured for redirecting the IO operation to another IO path in an occurrence of exception.

12. The system of claim 10, further comprising an IO context table communicatively coupled with said fastpath engine, wherein said fastpath engine further configured for:
upon validation of the request descriptor, creating an IO context record corresponding to the request descriptor and storing the IO context record in the IO context table; and
upon completion of the IO request, deleting the IO context record from the IO context table.

13. The system of claim 10, further comprising a hardware automated trace buffer configured for logging context information associated with the IO request.

14. The system of claim 10, further comprising a hardware automated timer wheel configured for detecting an occurrence of a time out when handling the IO request.

15. A method for handling an IO request, comprising:
transporting the IO request to a local memory via a direct memory access (DMA) operation;
determining whether a target end device of the IO request is one of a list of fastpath enabled target end devices stored in a fastpath device table;
processing the IO request utilizing a hardware automated IO path when the target end device of the IO request is a fastpath enabled target end device, further comprising:
determining a local message index descriptor (LMID) for associating with a request descriptor of the IO request;
creating a fastpath descriptor based on the request descriptor;
performing an IO operation according to the fastpath descriptor;
providing a completion message upon a successful completion of the IO operation;
releasing the IO request stored in the local memory; and
providing a reply message in response to the IO request, the reply message being provided based on the completion message.

16. The method of claim 15, further comprising:
redirecting the IO operation to another IO path in an occurrence of exception.

* * * * *